United States Patent [19]

Gajewski

[11] 4,378,377
[45] Mar. 29, 1983

[54] CEREAL PRESWEETENED WITH ASPARTAME AND METHOD OF PREPARATION

[75] Inventor: Robert J. Gajewski, Crystal, Minn.

[73] Assignee: General Mills, Inc., Minneapolis, Minn.

[21] Appl. No.: 342,288

[22] Filed: Jan. 25, 1982

[51] Int. Cl.³ .............................................. A23L 1/164
[52] U.S. Cl. ...................................... 426/96; 426/302; 426/548; 426/620; 426/656
[58] Field of Search ................. 426/548, 620, 804, 96, 426/103, 302, 656

[56] References Cited

U.S. PATENT DOCUMENTS 3,943,258  3/1976  Bahosky et al. ......................... 426/3
3,947,600  3/1976  Rousseau ............................. 426/302
3,955,000  5/1976  Baggerly ............................... 426/96
4,079,151  3/1978  Schade et al. ......................... 426/96
4,139,639  2/1979  Bahoshy et al. ......................... 426/3

Primary Examiner—Raymond N. Jones
Assistant Examiner—Elizabeth A. Hatcher
Attorney, Agent, or Firm—G. O. Enockson; John A. O'Toole

[57] ABSTRACT

Disclosed are comestibles, particularly ready-to-eat cereals, having an exterior coating sweetened with aspartame as well as methods of preparing such coated comestibles. The methods of preparation comprise: (a) preparing an aqueous suspension comprising sufficient amounts of vegetable protein isolates to provide a viscosity of 50 to 25,000 cp. (65° F.) and from about 0.1% to 4% aspartame; (b) enrobing a comestible with the aqueous suspension at a temperature of from about 50° F. to 100° F. to apply sufficient amounts of aspartame so as to provide between about 0.05% to 0.4% aspartame; and then (c) drying the comestibles to a final moisture content of less than about 5%.

11 Claims, No Drawings

CEREAL PRESWEETENED WITH ASPARTAME AND METHOD OF PREPARATION

BACKGROUND OF THE INVENTION

1. Field of the Invention

The present invention relates to food products and to methods of their preparation. More particularly, the present invention relates to cereal products presweetened with a coating containing aspartame.

2. The Prior Art

Cereal products, particularly ready-to-eat (hereinafter "R-T-E") breakfast cereals, are well known and popular food items, particularly presweetened R-T-E cereals. Typically, such products include various coatings usually comprising nutritive carbohydrate sweeteners such as sucrose, corn syrup, fructose, etc. While presweetened cereals are popular, concern exists about the affect of such sugars upon diet and dental health.

Attempts have been made to substitute high potency sweeteners such as aspartame for sugar to provide presweetened cereals to reduce sugar consumption. However, aspartame is thermally unstable, causing decomposition and concommitant loss of sweetness. Since aspartame is thermally unstable, the sweetener has been applied to the surface as a coating to the cereal base rather than being added to the other cereal ingredients such as flour, starches, nuts, etc. from which the base is prepared by cooking, explosion, puffing, etc.

Aspartame (L-aspartyl-L-phenylalanine methyl ester) is relatively water insoluble (apx. 1% in water at 20° C.) Thus, application of such sweeteners to a cereal base as a coating presents certain difficulties such as unevenness of application. Such unevenness can result in a phenomenon called "hotspotting" characterized by an intense taste sensation when consumed.

Art attempts to provide cereals coated with aspartame include U.S. Pat. No. 3,955,000 (issued May 4, 1976 to P. A. Baggerly). There, the aspartame was admixed in aqueous suspension with relatively high concentrations of water soluble dextrins. Atomization is used to evenly apply the suspension to the cereal base. A similar technique is disclosed in U.S. Pat. No. 4,079,151 (issued Mar. 14, 1978). There, however, malto dextrin was substituted for the hydrolyzed dextrins in the aqueous dispersion so as to provide a coating which upon drying provides a frosted appearance as opposed to the glassy appearance taught as resulting from the methods of the '000 patent. The '151 patent also teaches the necessity of spraying the suspension with successive applications in order to produce a frosted appearance.

Other products such as chewing gums have also been provided with coatings containing aspartame as the sweetening agent (see, for example, European Pat. No. 27,024 issued 15/4/81 to Michael Glass and Theresa Cea). There, the aspartame as well as other coating ingredients are dusted onto the article surface and then mechanically affixed to the relatively soft gum exterior by rolling, sizing or wrapping, etc.

The present invention, however, is an improvement over the non-mechanical methods and products of the '000 and '151 patents in at least three respects. First, it has been found that another class of materials previously unrecognized as being suitable for use in aspartame coatings has been surprisingly found to be useful. These materials newly discovered as being useful include vegetable proteins. Second, and more importantly, the present invention can be practiced with cold water or ambient temperature aqueous suspensions being used as a carrier for the aspartame coating. Employment of cold aqueous suspension minimizes or at least reduces the thermal degradation of aspartame caused by the processes of the '000 and '151 patents. Third, the present invention eliminates multiple coating steps previously recognized as being necessary and accomplishes a satisfactory coating in a single application step.

SUMMARY OF THE INVENTION

The present invention relates to comestibles, particularly R-T-E cereals, having a coating comprising aspartame and hydrolyzed or unhydrolyzed vegetable protein isolates. The aspartame is present at from about 0.05% to 0.4% by weight of the food product. The vegetable protein is essentially present at from 1% to 20% of the final product.

In its method aspect, the present invention relates to methods for the preparation of comestibles having a sweetened coating wherein the sweetener is aspartame. The present method includes as essential steps: (a) providing an aqueous suspension or carrier for the aspartame; (b) enrobing the comestible with sufficient amounts of the suspension to provide requisite aspartame levels; and (c) drying the enrobed comestible to a final moisture content of less than about 5.0%.

The aqueous suspension essentially comprises from about 0.1% to 4.0% aspartame and essentially from about 1% to 30% of the vegetable protein.

The enrobing step is generally practiced at a temperature of from about 50° F. to 100° F. for both the comestible base and the suspension. Sufficient amounts of aqueous suspension are used to enrobe the comestible so as to apply from about 0.5% to 0.4% aspartame based on the comestible (dry weight).

DETAILED DESCRIPTION OF THE INVENTION

The present invention relates to comestibles, particularly R-T-E cereals, having a coating sweetened with aspartame. In its method aspect, the present invention relates to processes for the preparation of such coated comestibles comprising the steps in sequence of (a) providing an aqueous suspension of aspartame, (b) enrobing the comestible with the aqueous suspension; and (c) drying the comestible. Each of these product preparation steps as well as product use are described in greater detail below.

Throughout the specification and claims, percentages and ratios are by weight, and temperatures in degrees Fahrenheit, unless otherwise indicated.

A. Providing an Aqueous Suspension of Aspartame

An essential step of the present method is to provide an aqueous suspension of aspartame. The term "aspartame" is used in its conventional sense as a generic term referring to high intensity dipeptide sweeteners which are derivatives of two amino acids, L-aspartic acid and the methyl ester of phenylalanine. These compounds are generally well known in the art and are disclosed in detail in, for example, the '151 and the '000 patents referenced above and incorporated herein by reference. Aspartame is commercially available as an odorless, white, crystalline powder having a sweetness generally characterized as apx. 200 times that of sucrose.

The suspension of aspartame generally includes from about 0.1% to about 4% aspartame, preferably from about 1% to 2%. Of course, since aspartame is only slightly soluble in cold water, a small fraction of the aspartame will be in solution; however, the larger fraction will be suspended and dispersed. The particle size of the aspartame is not critical. It is preferred, however, that the particle size be fine since smaller particle sizes are useful in realizing more stable aqueous suspensions. Also, a reduced particle size favorably affects the evenness of the aspartame distribution on the coating composition. Aspartame of conventional and commercially available fineness are quite suitable for use herein such as Nutra Sweet ® brand available from Searle Food Resources Inc., subsidiary of G. V. Searle & Co.

The suspending agent in the present invention essentially comprises vegetable protein isolates, including both hydrolyzed and unhydrolyzed isolates, each available from the Ralston Purina Co. Of vegetable protein isolates, soy protein isolates both hydrolyzed and unhydrolyzed are preferred for use herein due to their wide commercial availability and relative low cost, e.g., SUPRO ® 610 brand soy isolate and SUPRO ® 710 brand soy isolate. The suspending agents(s) is present at from about 1% to 30% of the aqueous suspension. Better results in terms of sprayability, cost and flavor of product are obtained when the concentration ranges from about 5% to 13%. For best results, the vegetable protein isolates' concentration is about 10% in the aqueous suspension.

The useful vegetable protein isolates materials herein are merely those which provide a viscosity to the aqueous suspension of between about 50 to 25,000 cp. (65° F.) and preferably from about 500 to 15,000 cp. Such a viscosity is important to stabilization of the undissolved aspartame in the aqueous suspension. The viscosity is also important to the even distribution of the suspension during the subsequent enrobing step described below and thus the even distribution of aspartame in the final coating. As the term is used in the art, suitable materials for use herein are those which are "water soluble" (greater than about 10% by weight soluble in water at 25° C.). Those protein isolates which are water insoluble resulting from, for example, neutralization, fail to provide the desired viscosities herein.

Soy protein isolate is commercially available and the processing of soybeans to soy protein isolates is well known as evidenced by "Soybeans and Soybean Products," by Klare S. Markley, Interscience Publishers, Inc., 1950 (incorporated herein by reference). Conventionally, soybeans are first crushed or subjected to an extraction operation to remove soy oil and form what is termed defatted soy flour. The defatted soy flour is thereafter treated with alcohol to remove some bitter constituents, dried, and slurred in water of a pH of about 8-10 thereby solubilizing the protein material. The insolubles are filtered out leaving behind the protein still in solution. This protein can be recovered by readjusting the pH of the solution to about 4-5 thereby causing the protein to precipitate out of solution whereupon it is recovered by filtration and dried.

As is well known, hydrolysis is widely used to provide hydrolyzed vegetable protein isolates or "HVPI" of widely varying average molecular weights. Exemplary methods are described in detail in U.S. Pat. No. 3,814,816 (issued June 4, 1974 to R. C. Gunther, incorporated herein by reference). Generally, the HVPI are prepared by initially chemically hydrolyzing the vegetable protein to a prescribed viscosity range and thereafter enzymatically hydrolyzing the vegetable protein, e.g., with pepsin, to produce the HVPI's of various average molecular weights. If HVPI's are used, then the average molecular weight of the hydrolyzate is generally about 0.25 of the average initial molecular weight of the unhydrolyzed starting material. These soy protein isolate materials are, for example, commercially available from, for example, A. E. Staley Mfg. Co., Decatur, Illinois or from the Ralston Purina Co.

As indicated above, both hydrolyzed and unhydrolyzed vegetable protein isolates can be used herein. However, if greater protein levels are desired, e.g., for protein fortification, then lower molecular weight proteins, i.e., hydrolyzed protein isolates are preferred, since lower molecular weight protein isolates generally provide lower viscosity aqueous suspensions at equivalent concentrations. Conversely, if lower protein levels are desired, e.g., for cost reduction, then preferably the vegetable protein isolate is unhydrolyzed.

The proteinaceous suspending agents useful herein must perform all of several functions. First, the agents must be capable of maintaining the aspartame in suspension. Also, the suspending agent serves an adhesive function binding the aspartame to the surface of the comestible. Additionally, the suspending agent aids in the even distribution of the suspension over the comestible base during enrobing. It has been surprisingly discovered that instead of the carbohydrate based materials previously suggested for use such as the dextrinaceous saccharidic materials of the '000 patent and the malto dextrinaceous materials of the '151 patent, that proteinaceous materials can also be usefully employed.

Another advantage of employing the present proteinaceous materials is the fortification of the food product by virtue of the addition of a protein material. Still another advantage of the present invention is that selection of the present materials, unlike prior art materials, allows for using ambient temperature or "cold water" aqueous suspensions to realize coated comestibles. Since aspartame thermal degradation is both time and temperature dependent, employment of cold water suspensions minimizes undesirable thermal degradation of the expensive aspartame ingredient and thus the concommitant loss in sweetness. Desirably then, the aqueous suspension is maintained at a temperature no greater than about 100° F.

Of course, while it is intended that aspartame will be the primary sweetener in the coatings of the present invention, any other conventional sweeteners, e.g., sucrose, fructose, corn syrups, honey, etc. can be used in the coating to supplement the sweetness of the aspartame.

If allowed to stand for lengthy periods, some settling of the undissolved aspartame may occur. Simple mixing or agitating can be used to evenly distribute the aspartame throughout the aqueous suspension prior to the enrobing step.

B. Enrobing

Another essential step of the present product preparation process is to enrobe the comestible with the aqueous suspension of aspartame.

The weight ratio of aqueous suspension to comestible base can vary widely depending most strongly on the final concentration or sweetness of aspartame desired in the coating and the concentration of aspartame in the aqueous suspension. Generally, however, good results are obtained when the weight ratio of aqueous suspension to commestible base ranges from about 1:12 to about 1:1.3. Preferably, the weight ratio ranges from about 1:9 to 1:3.

Any desired comestible base can be used herein, e.g., gum pieces, confections, doughnuts, etc. The present invention has particular usefulness in the provision of presweetened R-T-E cereals. The cereal particles which may be coated in accordance with this invention include all R-T-E cereal particles in flaked, shredded, expanded, or other forms, such as corn flakes, shredded wheat, puffed wheat, puffed rice, expanded oats, puffed corn, bran flakes, whole bran cereal, breakfast cereals in the form of extruded and puffed doughs, and the like. Such cereal particles are prepared in the usual manner and may be either toasted or untoasted.

Any conventional enrobing apparatus and technique can be used to practice the present enrobing or application step. Generally, a useful technique involves tumbling. The comestible piece(s) and aqueous suspension are each charged in any order to a rotating drum and tumbled for a sufficient time to achieve an even distribution of the suspension on the comestible. Preferably, the aqueous suspension is added after the comestible has been added to the drum. Another useful technique is simply spraying the aqueous solution over those comestibles which are desirably not tumbled due to the shape, frangibility, etc.

Since aspartame is thermally unstable, it is desirable to maintain the aqueous suspension at low temperatures, e.g., room temperature or below. However, the temperature of the suspension can range during the enrobing step from about 50° F. to 100° F. and preferably between about 60° F. to 80° F. When R-T-E cereal pieces are being coated, the cereal pieces typically will be warm, ranging in temperature, for example, from about 120° F. to 180° F. Since it is desirable to keep the aspartame cool, in such instances, ambient temperature or cooler aqueous suspensions are preferred for use.

C. Drying

An essential step in the present method is to dry or dehydrate the enrobed comestible pieces to a moisture content of less than about 5%, and preferably less than about 3% to form the coated comestibles of the present invention sweetened with aspartame. Any conventional method of drying and equipment can be used to reduce the moisture content of the enrobed comestible pieces. The drying can be accomplished using such equipment as rotary bed, tray and belt dryers. The preferred dehydration technique is forced hot air convection drying. Of course, since aspartame is thermally unstable, preferred drying techniques are those which are practiced at reduced temperatures.

The finished dipeptide sweetened product yields a sweetness profile similar to sucrose sweetened comestibles and desirably comprises from about 0.05% to 0.4% aspartame, preferably from about 0.1% to 0.2%, and from about 1% to 20% of the vegetable protein, preferably from about 2% to 13%.

The following examples are given to further illustrate the present invention but not to limit the invention disclosed herein.

EXAMPLE I

The following slurry was made up using a Waring Blender to mix and disperse the components.

| | |
|---|---|
| Hydrolyzed soy protein isolate (Ralston SUPRO® 710) | 100 g. |
| Cold tap water | 250 g. |

The viscosity is determined to be about 20,250 cp. (65° F.).

To 60 grams of the above mentioned slurry, 1.3 grams aspartame were added and mixed in by hand. The room temperature suspension was sprayed on 600 grams of a dried, puffed cereal base in an enrober using a Sears brand hand held paint spray gun. This product was dried in a forced air dryer for 10 minutes at 180° F. Its finished composition on a dry weight basis is as follows:

| | |
|---|---|
| Puffed Cereal Base | 97.02% (DWB) |
| Hydrolyzed soy protein isolate | 2.77 |
| Aspartame | 0.21 |
| | 100.00% |

The coating thus comprises about 3% of the food product.

The presweetened cereal so prepared exhibits a pleasant sweet flavor without any bitterness normally associated with proteins.

EXAMPLE II 1.3 grams of aspartame was added to 190 g. of the slurry mentioned in Example I and mixed using the Waring Blender to disperse it evenly. The same procedure was used to apply the slurry to 600 g. cereal base. The product was dried at 250° F. for 15 minutes in a forced air dryer, resulting in the following final composition on a dry weight basis.

| | |
|---|---|
| Puffed cereal base | 91.51% (DWB) |
| Hydrolyzed soy isolate protein | 8.29 |
| Aspartame | 0.20 |
| | 100.00% |

The presweetened cereal so prepared had a pleasing level of sweetness resulting from the coating.

EXAMPLE III

The following suspension was produced by mixing the ingredients by hand.

| | |
|---|---|
| Non-hydrolyzed soy protein isolate (Ralston SUPRO®-610) | 25 g. |
| Cold tap water | 200 |
| Aspartame | 3 |

The slurry had a viscosity of 2,500 cp (65° F.)

This slurry was poured on 1,000 g. of a commercially available flaked cereal base in a small enrober and dried for 30 minutes at 180° F. in a forced air dryer. The resulting composition is on a dry weight basis.

| | |
|---|---|
| Flaked cereal base | 97.34% |
| Soy protein isolate | 2.36 |
| Aspartame | 0.30 |
| | 100.00% |

The composition so prepared had a pleasant sweetness resulting from the coating.

What is claimed is:

1. A sweetened dry comestible, comprising:
   from about 1% to 20% of the comestible of a coating, said coating including from about 1% to 20% of a water-soluble vegetable protein isolate, and about 0.5% to 0.04% aspartame.

2. The comestible of claim 1 wherein the comestible is a ready-to-eat cereal particle.

3. The comestible of claim 2 wherein the aspartame is present at from about 0.1% to 0.2% by weight of the comestible and wherein the water-soluble vegetable protein isolate is present at from about 2% to 13% by weight of the comestible.

4. The comestible of claim 3 wherein the vegetable protein is selected from the group consisting of soy protein isolates and hydrolyzed soy protein isolates.

5. A method for coating a dry comestible with aspartame, comprising the steps of:
   A. providing an aqueous suspension, comprising
      (1) from about 0.4% to 4% by weight of the suspension of aspartame,
      (2) from about 1% to 30% of the suspension of a water soluble vegetable protein isolate and sufficient to provide the suspension with a viscosity of about 50 to 25,000 cp. (65° F.).

6. The method of claim 5 wherein the comestible base is a ready-to-eat cereal particle.

7. The method of claim 6 wherein the aqueous suspension comprises from about 5% to 13% of the vegetable protein isolate, said isolate being selected from the group consisting of soy protein isolates and hydrolyzed soy protein isolates.

8. The method of claim 7 wherein the weight ratio of aqueous suspension to comestible ranges from about 1:12 to 1:1.3 and wherein the temperature of the aqueous suspension ranges from about 60° F. to 80° F.

9. The method of claim 8 wherein the aspartame comprises from about 0.1% to 4.0% of the aqueous suspension and wherein the vegetable protein isolate is present in the aqueous suspension in amounts sufficient to provide a viscosity of from about 500 to 10,000 cp. (65° F.).

10. The comestible of claim 4 wherein the coating additionally comprises a nutritive carbohydrate sweetening agent.

11. The method of claim 9 wherein the weight ratio of aqueouus suspension to comestible ranges from about 1:9 to 1:3, and wherein the aspartame comprises from about 1% to 2% by weight of the aqueous suspension.

* * * * *

UNITED STATES PATENT AND TRADEMARK OFFICE
CERTIFICATE OF CORRECTION

PATENT NO. : 4,378,377
DATED : March 29, 1983
INVENTOR(S) : Robert J. Gajewski

It is certified that error appears in the above—identified patent and that said Letters Patent are hereby corrected as shown below:

Col. 5, line 2 - "commestible" should be -- comestible --.

Col. 6, line 53 - "®-610" should be -- ®610 --.

Col. 6, line 57 - "2,500" should be -- 2,050 --.

Col. 7, line 8 - "0.5%" should be -- 0.05% --.

Signed and Sealed this

Second Day of August 1983

[SEAL]

Attest:

Attesting Officer

GERALD J. MOSSINGHOFF

Commissioner of Patents and Trademarks